United States Patent
Lei et al.

(10) Patent No.: US 11,481,964 B2
(45) Date of Patent: Oct. 25, 2022

(54) THREE DIMENSIONAL VOLUME IMAGING

(71) Applicant: HEWLETT-PACKARD DEVELOPMENT COMPANY, L.P., Spring, TX (US)

(72) Inventors: Yang Lei, Palo Alto, CA (US); Viktor Shkolnikov, Palo Alto, CA (US); Daixi Xin, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,949

(22) PCT Filed: Apr. 27, 2018

(86) PCT No.: PCT/US2018/030034
§ 371 (c)(1),
(2) Date: Oct. 17, 2019

(87) PCT Pub. No.: WO2019/209345
PCT Pub. Date: Oct. 31, 2019

(65) Prior Publication Data
US 2021/0366181 A1 Nov. 25, 2021

(51) Int. Cl.
*G06T 15/00* (2011.01)
*G06T 15/20* (2011.01)
*G06T 17/00* (2006.01)

(52) U.S. Cl.
CPC ............ *G06T 15/205* (2013.01); *G06T 17/00* (2013.01); *G06T 2207/10004* (2013.01); *G06T 2207/30024* (2013.01)

(58) Field of Classification Search
None
See application file for complete search history.

(56) References Cited

U.S. PATENT DOCUMENTS 5,579,358 A * 11/1996 Lin ..................... A61B 6/032
                                                250/363.04
5,680,484 A    10/1997 Ohyama et al.
(Continued)

FOREIGN PATENT DOCUMENTS

WO    2017/151978 A1    9/2017

OTHER PUBLICATIONS

Benhal, A Micro-Device Integrating Vertical and Bottom Electrodes for 3D Cell Rotation, 2013, University of Canterbury (Year: 2013).*
(Continued)

*Primary Examiner* — Anh-Tuan V Nguyen
(74) *Attorney, Agent, or Firm* — Fabian VanCott (57) ABSTRACT

A three-dimensional volume modeling method may include rotating a three-dimensional biological object having a translucent outer surface to different angular positions, capturing different two-dimensional images of the three-dimensional biological object, each of the different two-dimensional images being at a different angular position, and modeling an exterior of the three-dimensional biological object based upon the different two-dimensional images. The method may further involve identifying a point of an internal structure of the three-dimensional biological object each of the two-dimensional images and modeling the internal structure of the three-dimensional biological object in three-dimensional space relative to the exterior of the three-dimensional biological object by triangulating the point amongst the different two-dimensional images using a three-dimensional volumetric template of the three-dimensional biological object.

20 Claims, 4 Drawing Sheets

(56) References Cited

U.S. PATENT DOCUMENTS

| | | | |
|---|---|---|---|
| 7,738,695 B2 | 6/2010 | Shorte et al. | |
| 2004/0076315 A1* | 4/2004 | Scoll | G06K 9/0014 382/128 |
| 2009/0010507 A1* | 1/2009 | Geng | G06T 7/593 382/128 |
| 2009/0198133 A1* | 8/2009 | Kawagishi | A61B 8/463 600/443 |
| 2009/0208072 A1* | 8/2009 | Seibel | G06T 11/006 382/128 |
| 2010/0111397 A1* | 5/2010 | Garud | G06T 7/0012 382/133 |
| 2011/0037831 A1 | 2/2011 | Wang | |
| 2011/0064271 A1 | 3/2011 | Wang | |
| 2013/0094749 A1* | 4/2013 | Oh | A61B 6/032 382/133 |
| 2013/0329011 A1* | 12/2013 | Lee | G06T 19/20 348/46 |
| 2014/0022253 A1* | 1/2014 | Nakagawa | G06T 7/344 345/427 |
| 2014/0030737 A1* | 1/2014 | Holmes | G01N 33/56972 435/7.24 |
| 2014/0071452 A1* | 3/2014 | Fleischer | G01N 21/59 356/436 |
| 2014/0300723 A1* | 10/2014 | Oshima | G02B 21/365 348/79 |
| 2015/0371105 A1* | 12/2015 | Yang | G06V 10/60 348/136 |
| 2017/0046833 A1* | 2/2017 | Lurie | G06T 5/008 |
| 2017/0299371 A1 | 10/2017 | Cotte et al. | |
| 2017/0316915 A1* | 11/2017 | Okai | H01J 37/14 |

OTHER PUBLICATIONS

Fauver et al., "Development of Micro-Optical Projection Tomography for 3D Analysis of Single Cells",, Proc. SPIE, vol. 5324, Jul. 2004, pp. 171-181.

Guo et al., "Multi-Modal 3d Reconstruction and Measurements of Zebrafish Larvae and its Organs Using Axial-View Microscopy", IEEE International Conference on Image Processing (ICIP), Sep. 2017, pp. 2194-2198.

Lei et al., "3D Biological Cell Reconstruction with Multi-View Geometry", IEEE 17th International Symposium on Biomedical Imaging (ISBI), Apr. 2020, pp. 495-498.

Habaza, Mor, et al., "Rapid 3D Refractive-Index Imaging of Live Cells in Suspension without Labeling Using Dielectrophoretic Cell Rotation" Oct. 21, 2016, Advanced Science News, 9 pages.

Laksameethanasan, Danai "Three-dimensional reconstruction methods for micro-rotation fluorescence microscopy", Helsinki University of Technology, Espoo 2009, Report A09, 65 pages.

Laksameethanasan, Danai, et al., "A Bayesian reconstruction method for micro-rotation imaging in light microscopy", Microscopy Research and Technique, 71:158-167, (2008).

Laksameethanasan, Danai, et al., "A three-dimensional Bayesian reconstruction method with the point spread function for micro-rotation sequences in wide-field microscopy", Jan. 2006, pulled from the internet May 16, 2014, Available at: https://ieeexplore.ieee.org/abstract/document/1625158.

Rodrigo, José A., et al., "Fast label-free microscopy technique for 3D dynamic quantitative imaging of living cells", Nov. 9, 2017, Biomedical Optic Express, vol. 8 No. 12, 11 pages.

* cited by examiner

THREE DIMENSIONAL VOLUME IMAGING

BACKGROUND

Cellular structures such as cells, 3D cultures and organoids may serve as a key to understanding cellular mechanisms and processes. Such cellular structures are sometimes modeled or reconstructed to facilitate further study of such cellular structures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example three-dimensional volume modeling methods and systems that facilitate visualizing cellular structures (also referred to as three-dimensional biological objects) in three dimensions. The three-dimensional volume modeling methods and systems facilitate volume reconstruction or modeling, the modeling of the surface of the cellular structure and internal structures within the cell membrane. Such visualization may facilitate precise studies of distinct cellular mechanisms and interactions, providing novel insights into cell biology. For example, during cell division, three-dimensional information may provide additional angles and insights on how chromosomes get condensed and divided. The rotation of live cells and the creation of three-dimensional models may further provide information on transient occurrences such as endo- and exocytosis. Organelles and proteins may be fluorescently tagged in a live cell for visualization of distinct events such as mitochondrial division, nuclear fragmentation, trafficking of protein through Er/Golgi and the like. Studies of cellular function may be facilitated by the visualization and tracking of signaling molecules and organelles to obtain information regarding the mechanisms behind how signaling cascades through one cell and onto the next.

In contrast to confocal systems that (1) may be relatively complicated and expensive, utilizing precession stepping, confocal optics and high-sensitivity cameras, (2) that may experience data degradation as light from distant parts of the sample passed through parts of the sample proximate to the optics such that the proximal parts act as a filter adding noise and corrupting the imaging of the distant parts (especially relevant for fluorescence imaging with high fluorophore concentration) and (3) may experience data uncertainty due to low photon flux as data is collected from a thin plane, the disclosed three-dimensional volume modeling methods and systems facilitate volumetric reconstruction or modeling (in contrast to surface reconstruction or modeling) of cellular structures and other particles in a relatively simple, low cost and reliable manner. In contrast to modeling methods that output a point cloud, the disclosed three-dimensional volume modeling methods and systems output a parametric three-dimensional model of the biological object facilitate analysis.

The disclosed three-dimensional volume modeling methods and systems rotate biological or cellular structures in a fluid, during which images of the cellular structures are captured at different angles, such as through the use of multi-view geometry. The disclosed three-dimensional volume modeling methods and systems utilize structure from motion and predefined templates of such cellular structures to form three-dimensional volumetric reconstructions or models that facilitate the visualization of 3-D structure of a cell and its structures within. The resulting digital file or model may subsequently manipulated and analyzed in the study of cellular mechanisms and the modeling of specific cellular organelles. The three-dimensional model may be utilized to form a 3-D printer model to further facilitate the study of the cellular structures.

In some implementations, use of structure from motion is based on assumptions that the biological object, such as a cell body, is rigid and undergoes rigid movement during its rotation. During such modeling, interest points between consecutive two-dimensional video or image frames are matched point correspondence is obtained from image feature extraction and matching or point tracking in sequential video frames. A 3-D volumetric and parametric model is reconstructed from the matches using structure from motion and the predefined templates. Templates may be defined by a finite number of image features.

Disclosed herein is an example three-dimensional volume modeling method that may include rotating a three-dimensional biological object having a translucent outer surface to different angular positions, capturing different two-dimensional images of the three-dimensional biological object, each of the different two-dimensional images being at a different angular position, and modeling an exterior of the three-dimensional biological object based upon the different two-dimensional images. The method may further involve identifying a point of an internal structure of the three-dimensional biological object each of the two-dimensional images and modeling the internal structure of the three-dimensional biological object in three-dimensional space relative to the exterior of the three-dimensional biological object by triangulating the point amongst the different two-dimensional images using a three-dimensional volumetric template of the three-dimensional biological object.

Disclosed herein is an example three-dimensional volume modeling system. Imaging system may include a camera, a platform to support a three-dimensional biological object suspended in a fluid, a rotator to rotate the three-dimensional biological object about a rotational axis and while suspended in the fluid and a three-dimensional volume modeler. The three-dimensional volume modeler may receive different two-dimensional images of the three-dimensional biological object from the camera, each of the different two-dimensional images being at a different angular position. Modeler further models an exterior of the three-dimensional biological object based upon the different two-dimensional images. To model internal structure of the three-dimensional biological object, the modeler may identify a point of an internal structure of the three-dimensional biological object in each of the two-dimensional images. The modeler models the internal structure in three-dimensional space relative to the exterior of the three-dimensional biological object by triangulating the point amongst the different two-dimensional images using a three-dimensional volumetric template of the three-dimensional biological object.

Figure 1:
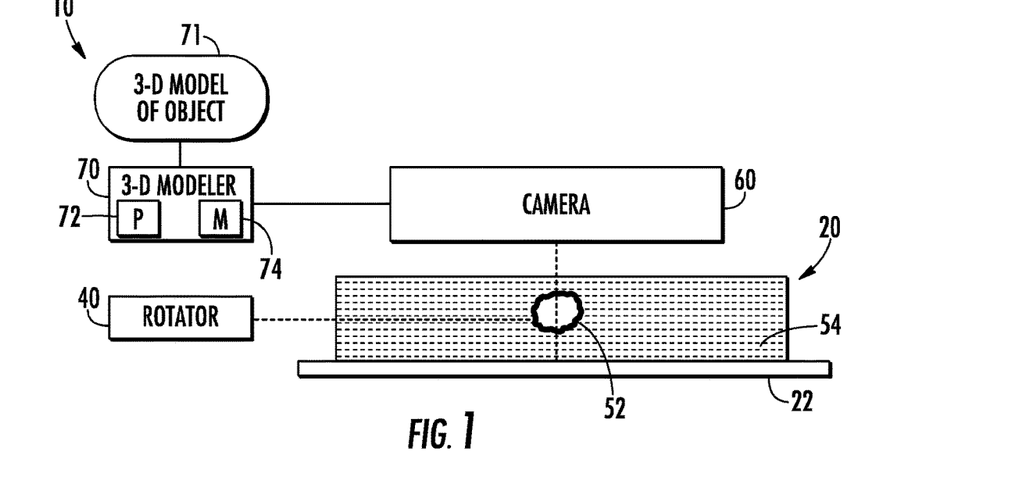
FIG. 1 is a schematic diagram of portions of an example three-dimensional volume modeling system.

FIG. 1 schematically illustrates portions of an example three-dimensional volume modeling system 10. Modeling system 10 forms a volumetric or three-dimensional model of a cellular structure that includes both the exterior surface and internal structures of the cellular structure. Modeling system 10 forms the volumetric model by rotating biological or cellular structures in a fluid, during which images of the cellular structures are captured at different angles. Modeling system 10 utilizes structure from motion in combination with predefined templates of such cellular structures to form three-dimensional volumetric reconstructions or models that facilitate the visualization of 3-D structure of a cell and its structures within. The resulting digital file or model may subsequently manipulated and analyzed in the study of cellular mechanisms and the modeling of specific cellular organelles. The three-dimensional model may be utilized to form a 3-D printer model to further facilitate the study of the cellular structures modeling system 10 comprises platform or platform 20, rotator 40, camera 60 and 3-D modeler 70.

Stage or platform 20 supports a three-dimensional biological object the two suspended in a fluid 54. A three-dimensional biological object may comprise a cell, a 3D culture or an organoid. 3D cultures are cells grown in droplets or hydrogels that mimic a physiologically relevant environment. Organoids are miniature organs grown in a lab derived from stem cells and clusters of tissue, wherein the specific cells mimic the function of the organ they model. 3-D cultures and organoids may be used to study basic biological processes within specific organs or to understand the effects of particular drugs. 3-D cultures and organoids may provide crucial insight into mechanisms of cells and organs in a more native environment.

In one implementation, platform 20 comprises a support or slide stage 22 upon which a slide may be mounted or may rest during imaging. In another implementation, platform 20 may comprise a microfluidic chip having microfluidic channels and a translucent or transparent chamber containing fluid 54 and the biological object 52 during its rotation. In some implementations, platform or stage 20 may comprise a growth platform on or in which the biological object 52, in the form of a 3D culture or organoid, is grown or maintained.

Rotator 40 comprises a device to controllably rotate a biological object 52 while the biological object is suspended in a fluid 54. In one implementation, rotator 40 provides electro-kinetic rotation. In one implementation, rotator 40 utilizes electrodes which form an electric field through and across region 50, wherein the electric field causes rotation of cellular object 52. In one implementation, rotator 40 comprises a pair of electrodes that apply a nonrotating nonuniform electric field so as to apply a dielectrophoretic torque to the biological object 52 is to rotate the object 52 while the object 52 is suspended in fluid 54. In one implementation, platform 20 is generally planar, extending in a flat plane, wherein cellular object rotator 40 rotates the biological object 52 about an axis parallel to the plane. Such rotation facilitates the capturing of images of the cellular object 52 at different angles to facilitate three-dimensional reconstruction or modeling of cellular object 52 for analysis.

Camera 60 comprises an imaging device that captures images of biological object 52 during rotation of biological object 52 by rotator 40. In one implementation, camera 60 comprises magnifying optics or lenses having a magnification of at least 1×. Camera 60 is to capture images are frames at a rate such that an image of a rotating biological object 52 may be captured at at least every frame without motion blur. Camera 60 outputs electronic signals to 3-D modeler 70 at periodic intervals or in batches.

3-D modeler 70 comprises a processing unit 72 in a non-transitory computer-readable medium in the form of a memory 74. Memory 74 contains instructions for directing processing unit 72 in the three-dimensional volumetric modeling of biological object 52. 3-D modeler 70 may output a 3-D model 71 of the biological object 52. In one implementation, 3-D modeler 70 may output a 3-D print model of the biological object 52.

3-D modeler 70 receives different two-dimensional images output by camera 60, wherein the different two-dimensional images are of the rotating feather object at different angular positions. Modeler 70 further models an exterior of the three-dimensional biological object 52 based upon the different two-dimensional images. To model internal structure of the three-dimensional biological object, the modeler 70 may identify a point of an internal structure of the three-dimensional biological object in each of the two-dimensional images. The modeler 70 models the internal structure in three-dimensional space relative to the exterior of the three-dimensional biological object by triangulating the point amongst the different two-dimensional images using a three-dimensional volumetric template of the three-dimensional biological object.

In one implementation, biological object 52 are rotated by rotator 40 independent of 3-D modeler 70. For example, rotator 40 may rotate the biological object 52 at a predefined rotational speed, wherein camera 60 captures images based upon the predefined speed and provides the two-dimensional images to 3-D modeler 70. In another implementation, 3-D modeler 70 may be part of a larger controller that additionally controls rotator 40 so as to control the rate at which biological object 52 is rotated in so as to control the capture of images by camera 60.

Figure 2:
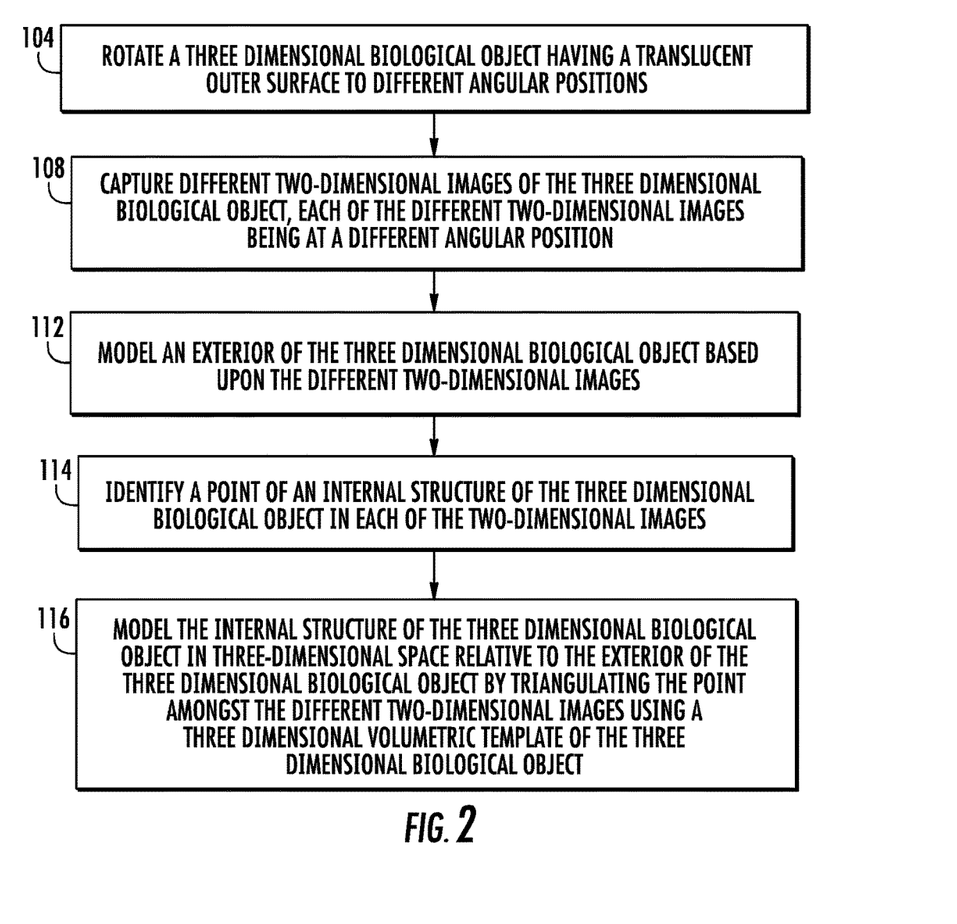
FIG. 2 is a flow diagram of an example three-dimensional volume modeling method.

FIG. 2 is a flow diagram of an example three-dimensional volume modeling method 100 for modeling biological objects such as cells, 3D cultures and organoids. Although method 100 is described in the context of being carried out by system 10, it should be appreciated that method 100 may likewise be carried out by any of the three-dimensional volume modeling systems described hereafter or by similar systems.

As indicated by block 104, a three-dimensional biological object, such as a cell, 3D culture or organoid having a translucent outer surface is rotated to different angular positions. Between taking consecutive images, the cellular object must have rotated a distance that at least equals to the diffraction limit dlim of the imaging optics. The relationship between minimum rotating angle θmin, radius r and diffraction limit distance dlim is θmin=dlim/r. For example, for imaging with light of λ=500 nm and a lens of 0.5 NA, the diffraction limit dlim=λ/(2NA)=500 nm. In the meanwhile, the cellular object cannot rotate too much that there is no overlap between consecutive image frames. So the maximum rotating angle between consecutive images θmax=180−θmin.

As indicated by block 108, different two-dimensional images of the three-dimensional biological object are captured, wherein each of the different two-dimensional images is at a different angular position. In one implementation, two-dimensional images of the three-dimensional biological object are captured at at least every 2.4 degrees. Such two-dimensional images may be transmitted to a 3-D modeler which carries out the modeling set forth in blocks 112, 114 and 116.

As indicated by block 112, three-dimensional modeler 70 may model an exterior of the three-dimensional biological object, such as object 52, based upon the different two-dimensional images. Such three-dimensional surface modeling may involve the merging of two-dimensional features from different angular positions using a single reference frame defining a single object coordinate, which is sometimes referred to as the "world coordinate".

As indicated by block 114, three-dimensional modeler 70 further identifies the point of an internal structure of the three-dimensional biological object in each of the two-dimensional images. Examples of such an internal point may include, but are not limited to, a nucleus or organs/organelles of a cell.

As indicated by block 116, three-dimensional modeler 70 models the internal structure of the three-dimensional biological object 52 in three-dimensional space relative to the exterior of the three-dimensional biological object by triangulating the point amongst the different two-dimensional images using a three-dimensional volumetric template of the three-dimensional biological object. The three-dimensional volumetric template identifies the expected internal positions of internal structures of the biological object. For example, the three-dimensional volumetric template of a cell may identify the expected centroid and radius. This three-dimensional volumetric template in combination with the tracked internal point of the biological object facilitates the modeling of internal structures to facilitate the volumetric modeling or reconstruction of the biological object.

Figure 3:
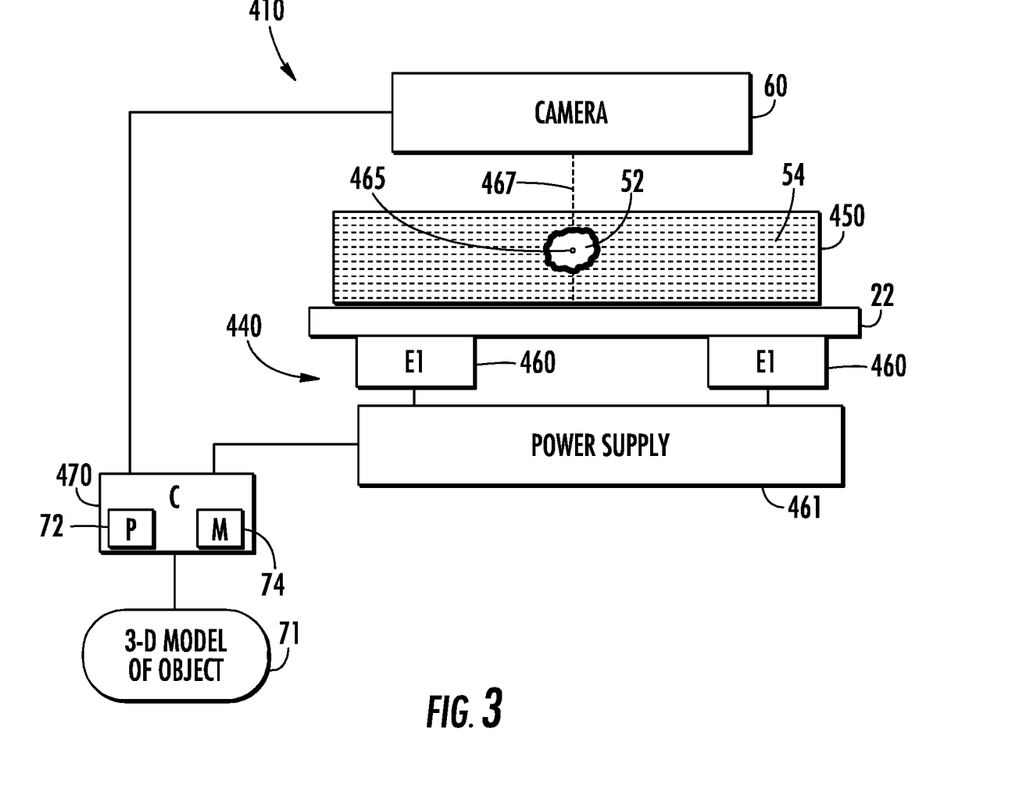
FIG. 3 is a schematic diagram of portions of an example three-dimensional volume modeling system.

FIG. 3 schematically illustrates portions of an example three-dimensional volume modeling system 410. Modeling system 410 is similar to modeling system 10 described above except the modeling system 410 is illustrated as specifically comprising rotator 440 and as comprising controller 470 in place of 3-D modeler 70. Those remaining components of modeling system 410 which correspond to components of modeling system 10 are numbered similarly.

As schematically shown by FIG. 3, object rotator 440 comprises electrodes 460 and power supply 461. Electrodes 460 are situated along an object fluid suspension region 450 containing fluid 54 in which the biological object 52 is suspended. Electrodes 460 produce an electric field within region 450. In the example growth platform 320, such electrodes 460 may be located within or below the platform 22, wherein electrodes 460 are located in a single plane that is parallel to the plane of platform 22. In other implementations, electrodes 460 may extend beneath or alongside region 450.

Power supply 461 supply the charged each of electrodes 460 and is under the control of controller 470. Controller 470 is similar to 3-D modeler 70 described above. Controller 470 comprises a processing unit 72 that follows instructions contained in a non-transitory computer-readable medium in the form of memory 74. Such instructions cause processing unit 72 to control power supply 461 to supply power to electrodes 460 such that electrodes 460 apply a nonrotating nonuniform electric field (shown in FIG. 4) to cellular object 52 suspended within the fluid 54, wherein nonrotating non-electric field applied to the dielectrophoretic torque to the biological object 52 so as to rotate the biological object 52 about axis 465 as indicated by arrow 467.

Figure 4:
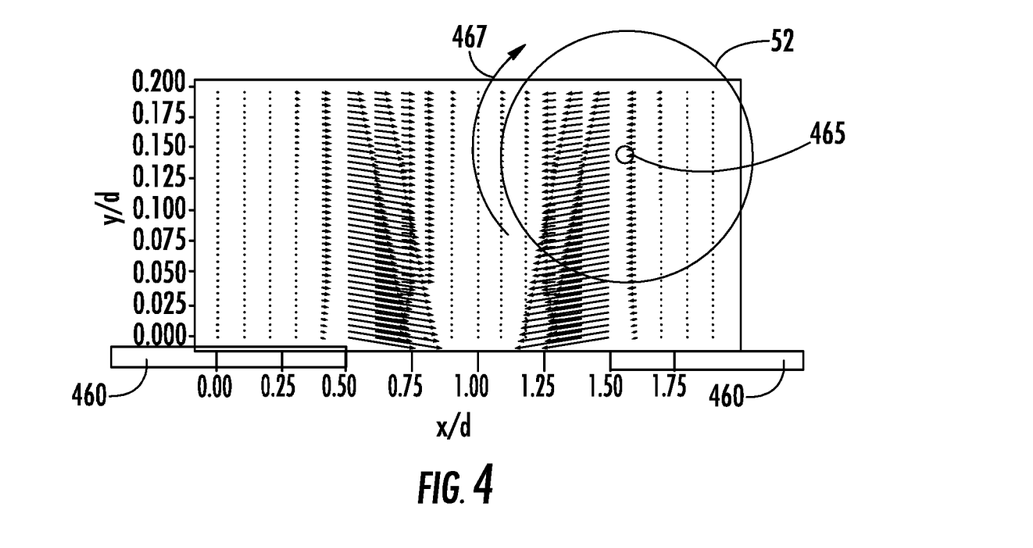
FIG. 4 is a diagram illustrating application of a nonrotating nonuniform electric field to an object to rotate the object during imaging.

In one implementation, the nonrotating nonuniform electric field is an alternating current electric field having a frequency of at least 30 kHz and no greater than 500 kHz. In one implementation, the nonrotating nonuniform electric field has a voltage of at least 0.1 V rms and no greater than 100 V rms. Between taking consecutive images, the cellular object must have rotated a distance that at least equals to the diffraction limit $d_{lim}$ of the imaging optics. The relationship between minimum rotating angle $θ_{min}$, radius r and diffraction limit distance $d_{lim}$ is $θ_{min}=d_{lim}/r$. For example, for imaging with light of λ=500 nm and a lens of 0.5 NA, the diffraction limit $d_{lim}$=λ/(2NA)=500 nm. In the meanwhile, the cellular object cannot rotate too much that there is no overlap between consecutive image frames. So the maximum rotating angle between consecutive images $θ_{max}$=180−$θ_{min}$. In one implementation, the nonuniform nonrotating electric field produces a dielectrophoretic torque on the cellular object so as to rotate the cellular object at a speed such that the imager 280 may capture images every 2.4 degrees while producing output in a reasonably timely manner. In one implementation where the capture speed of the imager is 30 frames per second, the produced dielectrophoretic torque rotates the cellular object at a rotational speed of at least 12 rpm and no greater than 180 rpm. In one implementation, the produced dielectrophoretic torque rotates the cellular object at least one pixel shift between adjacent frames, but where the picture shift is not so great so as to not be captured by the imager 280. In other implementations, cellular object 52 may be rotated at other rotational speeds.

In one implementation, the rotational axis 465 about which cellular object 52 is rotated extends in the plane of the growth platform (stage) that comprises the cellular object rotator 440. The axis 465 extends perpendicular to the optical axis 467 of camera 60. Because rotation of the object 52 is rotated about axis 465 that is perpendicular to the optical axis 467, imaging of all sides of object 52 at different angular positions is facilitated.

Figure 5:
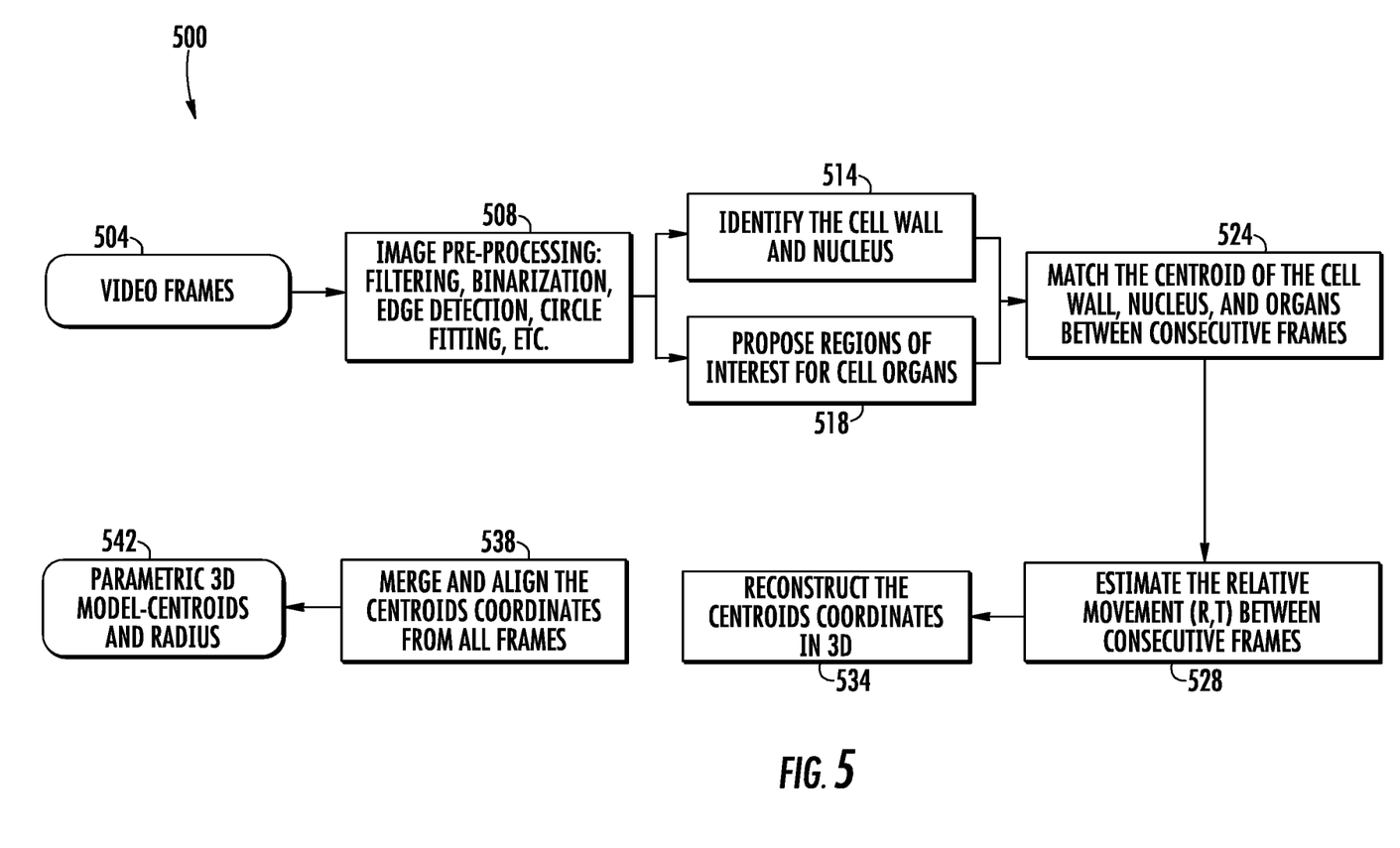
FIG. 5 a flow diagram of an example three-dimensional volume modeling method.

Memory 74 of controller 470 additionally comprise instructions for directing processor 72 to carry out three-dimensional volumetric modeling of the biological object 52. In one implementation, memory 74 of controller 470 direct processing unit sent to carry out the modeling processes set forth in block 112, 114 116 described above to output a three-dimensional volume model 71 of biological object 52. In another implementation, controller 470 may carry out three-dimensional volume modeling of biological object 52 using additional techniques in addition to structure promotion and predefined templates. Such additional techniques may include point correspondence, contour extract and back-projection, statistical shape models or other modeling methods. In one implementation, controller 470 may carry out three-dimensional volume modeling utilizing method 500 described below with respect to Figure numeral five.

FIG. 5 is a flow diagram of an example three-dimensional volumetric modeling method 500. As indicated by block 504, a controller, such as controller 470, receives video frames or two-dimensional images captured by the imager/camera 60 during rotation of object 52. As indicated by block 508, various preprocessing actions are taken with respect to each of the received two-dimensional image video frames. Such preprocessing may include filtering, binarization, edge detection, circle fitting and the like.

As indicated by block 514, utilizing such edge detection, circle fitting and the like, controller 470 retrieves and consults a predefined three-dimensional volumetric template of the object 52, to identify various internal structures of the object are various internal points in the object. The three-dimensional volumetric template may identify the shape, size and general expected position of internal structures which may then be matched to those of the two-dimensional images taken at the different angles. For example, a single cell may have a three-dimensional volumetric template comprising a sphere having a centroid and a radius. The three-dimensional location of the centroid and radius are determined by analyzing multiple two-dimensional images taken at different angles.

Based upon a centroid and radius of the biological object or cell, controller 470 may model in three-dimensional space the size and internal depth/location of internal structures, such as the nucleus and organelles. For example, with respect to cells, controller 470 may utilize a predefined template of a cell to identify the cell wall and the nucleus. As indicated by block 518, using a predefined template, controller 470 additionally identifies regions or points of interest, such as organs or organelles of the cell. As indicated by block 524, controller 470 matches the centroid of the cell membrane, nucleus and organelles amongst or between the consecutive frames so as to estimate the relative movement (R, T) between the consecutive frames per block 528.

As indicated by block 534, based upon the estimated relative movement between consecutive frames, controller 470 reconstructs the centroid coordinates in three-dimensional space. As indicated by block 538, the centroid three-dimensional coordinates reconstructed from every two frames are merged and aligned. A single copy of the same organelle is preserved. As indicated by block 542, controller 470 outputs a three-dimensional volumetric parametric model of object 52.

FIGS. 6-10 illustrate one example modeling process 600 that may be utilized by 3-D modeler 70 or controller 470 in the three-dimensional volumetric modeling of the biological object. Figure numeral 6-10 illustrate an example three-dimensional volumetric modeling of an individual cell. As should be appreciated, the modeling process depicted in FIGS. 6-10 may likewise be carried out with other biological objects.

Figure 6:
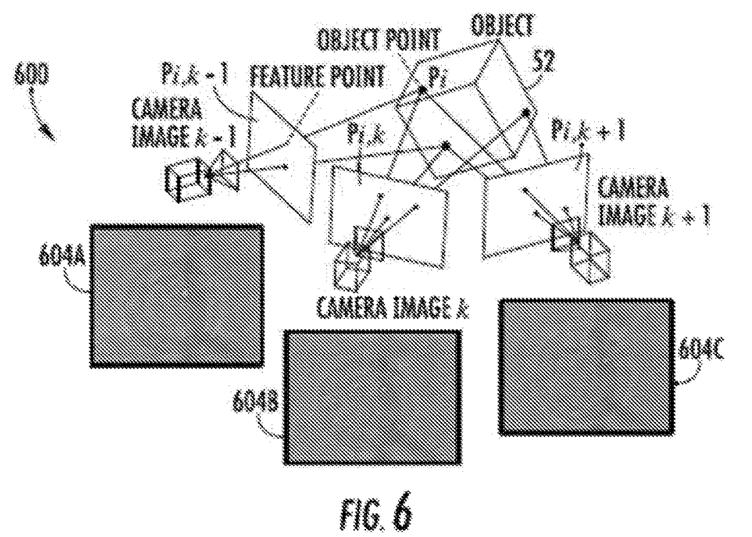
FIG. 6 is a diagram schematically illustrating the capture of two-dimensional image frames of a rotating object at different angles.

As shown by FIG. 6, two-dimensional video/camera images or frames 604A, 604B and 604C (collectively referred to as frame 604) of the biological object 52 (schematically illustrated) are captured at different angles during rotation of object 52. In one implementation, the frame rate of the imager or camera is chosen such as the object is to rotate no more than 5° per frame by no less than 0.1°. In one implementation, a single camera captures each of the three frames during rotation of object 52 (schematically illustrated with three instances of the same camera at different angular positions about object 52) in other implementations, multiple cameras may be utilized.

Figure 7:
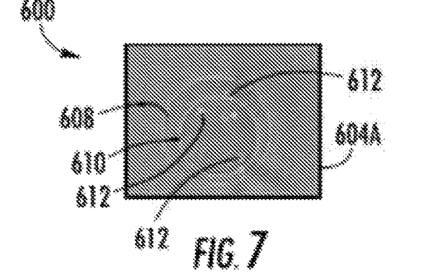
FIG. 7 is a diagram depicting an example image frame including the identification of features of an object at a first angular position.
Figure 8:
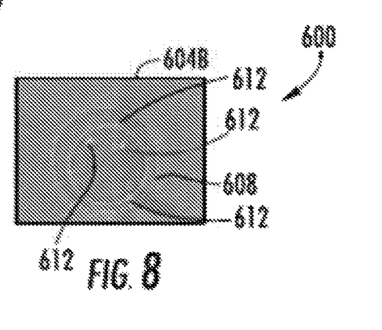
FIG. 8 is a diagram depicting an example image frame including the identifications of the features of the object at a second different angular position.

As shown by FIGS. 7 and 8, after image preprocessing set forth in block 508 in FIG. 5, edge detection, circle fitting another feature detection techniques are utilized to distinguish between distinct structures on the surface and within object 52, wherein the structures are further identified through the use of a predefined template for the object 52. For the example cell, controller 470 identifies wall 608, its nucleus 610 and internal points of interest, such as cell organs or organelles 612 in each of the frames (two of which are shown by FIGS. 7 and 8).

Figure 9:
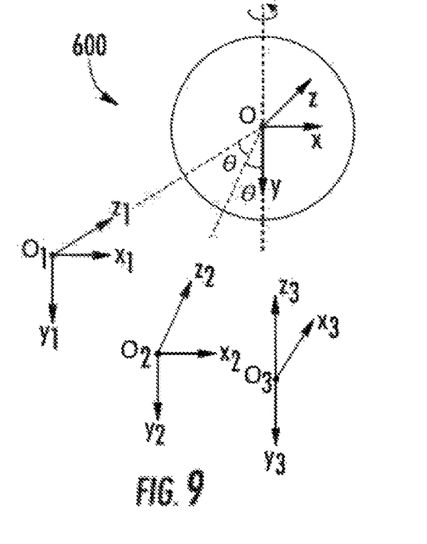
FIG. 9 is a diagram illustrating triangulation of the different identified features for the merging and alignment of features from the frames.

As shown by FIG. 9 and as described above with respect to blocks 524-538, controller 470 matches a centroid of a cell membrane, nucleus and organelles between consecutive frames, such as between frame 604A and 604B. Controller 470 further estimates a relative movement between the consecutive frames, reconstructs a centroid's coordinates in three-dimensional space and then utilizes the reconstructed centroid coordinates to merge and align the centroid coordinates from all of the frames. The relationship for the relative movement parameters R and T is derived assuming that the rotation axis is kept still and the speed is constant all the time. Then, just the rotation speed is utilized to determine R and T ($\overrightarrow{O_1O_2}$), as shown in FIG. 9, where:

$$\overrightarrow{O_1O_2} = \overrightarrow{OO_1} \cdot R_\theta \overrightarrow{OO_1};$$

$$R_\theta = R_y(\theta) = \begin{bmatrix} \cos\theta & 0 & \sin\theta \\ 0 & 1 & 1 \\ -\sin\theta & 1 & \cos\theta \end{bmatrix}$$

based on the following assumptions:

θ is constant;

$|\overrightarrow{OO_1}|=|\overrightarrow{OO_2}|=|\overrightarrow{OO_3}|= \ldots$ ;

rotation axis doesn't change (along y axis); and $\overrightarrow{OO_1}$ is known.

Figure 10:
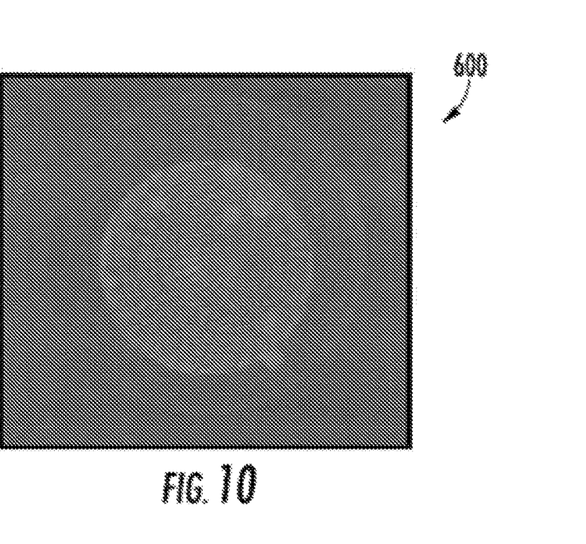
FIG. 10 is a diagram illustrating an example three-dimensional volumetric parametric model produced from the example image frames including those of FIGS. 7 and 8.

As shown by FIG. 10, the above reconstruction by controller 470 results in the output of a parametric three-dimensional volumetric model of the object 52, shown as a cell.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A three-dimensional volume modeling method comprising:
   rotating a three-dimensional biological object about a constant rotational axis at a constant speed while suspended in a fluid, the three-dimensional biological object having a translucent outer surface to different angular positions, wherein the rotating of the three-dimensional biological object comprises applying a nonuniform electric field;
   capturing different two-dimensional images of the three-dimensional biological object, each of the different two-dimensional images being at a different angular position;
   modeling an exterior of the three-dimensional biological object based upon the different two-dimensional images;
   identifying a point of an internal structure of the three-dimensional biological object in each of the two-dimensional images; and
   modeling the internal structure of the three-dimensional biological object in three-dimensional space relative to the exterior of the three-dimensional biological object by:
      identifying the shape, size, and expected position of the internal structure on a three-dimensional volumetric template;
      matching the internal structure of the three-dimensional volumetric template with the internal structure of the three-dimensional biological object;
      identifying additional organelles of the three-dimensional biological object based on the matching;
      triangulating the point amongst the different two-dimensional images using the three-dimensional volumetric template of the three-dimensional biological object to output a parametric three-dimensional model of the three-dimensional biological object;
      comparing a centroid of the internal structures including the additional organelles between consecutive frames to estimate movement of the three-dimensional biological object; and
      reconstructing the centroid movement in three-dimensional space.

2. The method of claim 1, wherein the different angular positions are such that between consecutive images, the biological object has rotated a distance that at least equals a diffraction limit of imaging optics.

3. The method of claim 1, wherein the rotating of the three-dimensional biological object is about a rotational axis and wherein the capturing of the two-dimensional image at each of the different angular positions is through a microscopic lens having an optical axis perpendicular to the rotational axis.

4. The method of claim 1, wherein the three-dimensional volumetric template is a model of a biological cell, the three-dimensional volumetric template having a centroid and a radius, wherein coordinates of the centroid are merged and aligned amongst the different images to reconstruct three-dimensional coordinates for the centroid.

5. The method of claim 1, wherein the different two-dimensional images are non-fluorescent.

6. The method of claim 1, wherein the different two-dimensional images are captured with a depth of focus of at least 200 nm.

7. The method of claim 1, wherein the modeling of the internal structure of the three-dimensional biological object comprises matching a centroid of a cell wall, a nucleus and organs of the three-dimensional biological object between the different two-dimensional images.

8. A three-dimensional volume imaging system comprising:
   a camera;
   a platform to support a three-dimensional biological object suspended in a fluid;
   electrodes to generate a nonuniform electric field to rotate the three-dimensional biological object about a constant rotational axis at a constant speed and while suspended in the fluid; and
   a three-dimensional volumetric modeler:
      to receive different two-dimensional images of the three-dimensional biological object from the camera, each of the different two-dimensional images being at a different angular position;
      to model an exterior of the three-dimensional biological object based upon the different two-dimensional images;
      to identify a point of an internal structure of the three-dimensional biological object in each of the two-dimensional images; and
      to model the internal structure of the three-dimensional biological object in three-dimensional space relative to the exterior of the three-dimensional biological object by:
      identifying the shape, size, and expected position of the internal structure on a three-dimensional volumetric template;
      matching the internal structure of the three-dimensional volumetric template with the internal structure of the three-dimensional biological object;
      identifying additional organelles of the three-dimensional biological object based on the matching;
      triangulating the point amongst the different two-dimensional images using the three-dimensional volumetric template of the three-dimensional biological object to output a parametric three-dimensional model of the three-dimensional biological object;
      comparing a centroid of the internal structures including the additional organelles between consecutive frames to estimate movement of the three-dimensional biological object; and
      reconstructing the centroid movement in three-dimensional space.

9. The system of claim 8, wherein the different angular positions are such that between consecutive images, the biological object has rotated a distance that at least equals a diffraction limit of the camera.

10. The system of claim 8 further comprising a microscopic lens having an optical axis perpendicular to the rotational axis, wherein the electrodes are to apply the nonuniform electric field to rotate the three-dimensional biological object about a rotational axis perpendicular to the optical axis.

11. The system of claim 8, wherein the three-dimensional volumetric template is a model of a biological cell, the template having a centroid and a radius, wherein coordinates of the centroid are merged and aligned amongst the different two-dimensional images to reconstruct three-dimensional coordinates for the centroid.

12. The system of claim 8, wherein three-dimensional volumetric modeler is to match a centroid of a cell wall, a nucleus and organs of the three-dimensional biological object between the different two-dimensional images.

13. The system of claim 8, wherein a frame rate of the camera is selected based on the constant speed of rotation of the biological object.

14. The system of claim 13, wherein the frame rate of the camera is selected such that the biological object rotates less than 5 degrees per frame.

15. The system of claim 13, wherein:
the constant speed of rotation of the biological object is between 12 and 180 rotations per minute; and
the frame rate is 30 frames per second.

16. The system of claim 8, wherein the constant rotational axis is parallel to the platform.

17. The system of claim 8, wherein the electrodes are disposed under the platform.

18. A non-transitory computer-readable medium containing three-dimensional volume imaging instructions to direct a processing unit to:
receive different two-dimensional images of the three-dimensional biological object from a camera, each of the different two-dimensional images being at a different angular position and captured while the biological object is being rotated using a nonuniform electric field along a constant rotational axis and at a constant speed;
model an exterior of the three-dimensional biological object based upon the different two-dimensional images;
identify a point of an internal structure of the three-dimensional biological object in each of the two-dimensional images; and
model the internal structure of the three-dimensional biological object in three-dimensional space relative to the exterior of the three-dimensional biological object by:
identifying the shape, size, and expected position of the internal structure on a three-dimensional volumetric template;
matching the internal structure of the three-dimensional volumetric template with the internal structure of the three-dimensional biological object;
identifying additional organelles of the three-dimensional biological object based on the matching;
triangulating the point amongst the different two-dimensional images using the three-dimensional volumetric template of the three-dimensional biological object;
comparing a centroid of the internal structures including the additional organelles between consecutive frames to estimate movement of the three-dimensional biological object; and
reconstructing the centroid movement in three-dimensional space.

19. The medium of claim 18, wherein the instructions at the processing unit to output control signals controlling the rotational speed at which the three-dimensional biological object is rotated and an image capture rate at which a camera captures the different two-dimensional images of the three-dimensional biological object during rotation of the three-dimensional biological object.

20. The medium of claim 18, wherein the instructions direct the processing unit to match a centroid of a cell wall, a nucleus and organs of the three-dimensional biological object between the different two-dimensional images.

* * * * *